United States Patent [19]

Moores, Jr. et al.

[11] 4,161,242
[45] Jul. 17, 1979

[54] POWER-DRIVEN DRILL AND SCREWDRIVER

[75] Inventors: Robert G. Moores, Jr., Reisterstown; Charles E. Hopkins, Sr., Baltimore, both of Md.

[73] Assignee: Black & Decker Inc., Newark, Del.

[21] Appl. No.: 806,907

[22] Filed: Jun. 15, 1977

[51] Int. Cl.² .................. B23B 21/00; F16D 11/00
[52] U.S. Cl. .................. 192/34; 144/32 R; 192/67 R; 192/93 R; 192/114 R
[58] Field of Search .................. 192/34, 67 R, 93 R, 192/114 R; 144/32 R

[56] References Cited

U.S. PATENT DOCUMENTS

| | | | |
|---|---|---|---|
| 1,865,022 | 6/1932 | Larson | 192/93 R |
| 2,485,878 | 10/1949 | Hanlon | 192/93 R X |
| 2,857,997 | 10/1958 | Graybill | 192/34 |
| 3,178,955 | 4/1965 | Enders et al. | 192/93 R X |
| 3,396,557 | 8/1968 | Moores, Jr. | 192/93 R X |
| 3,934,688 | 1/1976 | Sides et al. | 192/67 R X |

*Primary Examiner*—Allan D. Herrmann
*Attorney, Agent, or Firm*—Walter Ottesen; Leonard Bloom; Edward D. Murphy

[57] ABSTRACT

A power-driven drill and screwdriver includes a housing and a drive motor mounted in the housing. A case is attached to the housing and has a spindle bearing mounted therein. A first clutch is rotatably mounted in the case axially of the bearing and is operatively connected to the drive motor. An output spindle is journalled in the bearing and has a flange formed thereon. A second clutch is formed on the flange so as to be adjacent the first clutch. The output spindle is slideably mounted in the bearing so as to cause the second clutch to be movable relative to the first clutch between a first location whereat the second clutch firmly engages the first clutch and a second location whereat second clutch is disengaged from the first clutch. A spring resiliently biases the second clutch into the second location. An eccentric member is journalled in the case and is rotatable from one position corresponding to the screwdriving mode of the tool to another position corresponding to the drill mode of the tool. The eccentric member is arranged in the case with respect to the second clutch to counteract the urging force of the spring and to displace the second clutch into the first location when the eccentric member is rotated from one position to the other position. A handle is attached to the eccentric member at the outside wall surface of the case for manually rotating the eccentric member between the two positions. A first detent and a second detent coact with a detent member in the handle for defining the respective positions of the handle. The handle is connected to the eccentric member so as to cause the first detent to correspond to one of the positions and the second detent to correspond to the other one of the positions.

25 Claims, 10 Drawing Figures

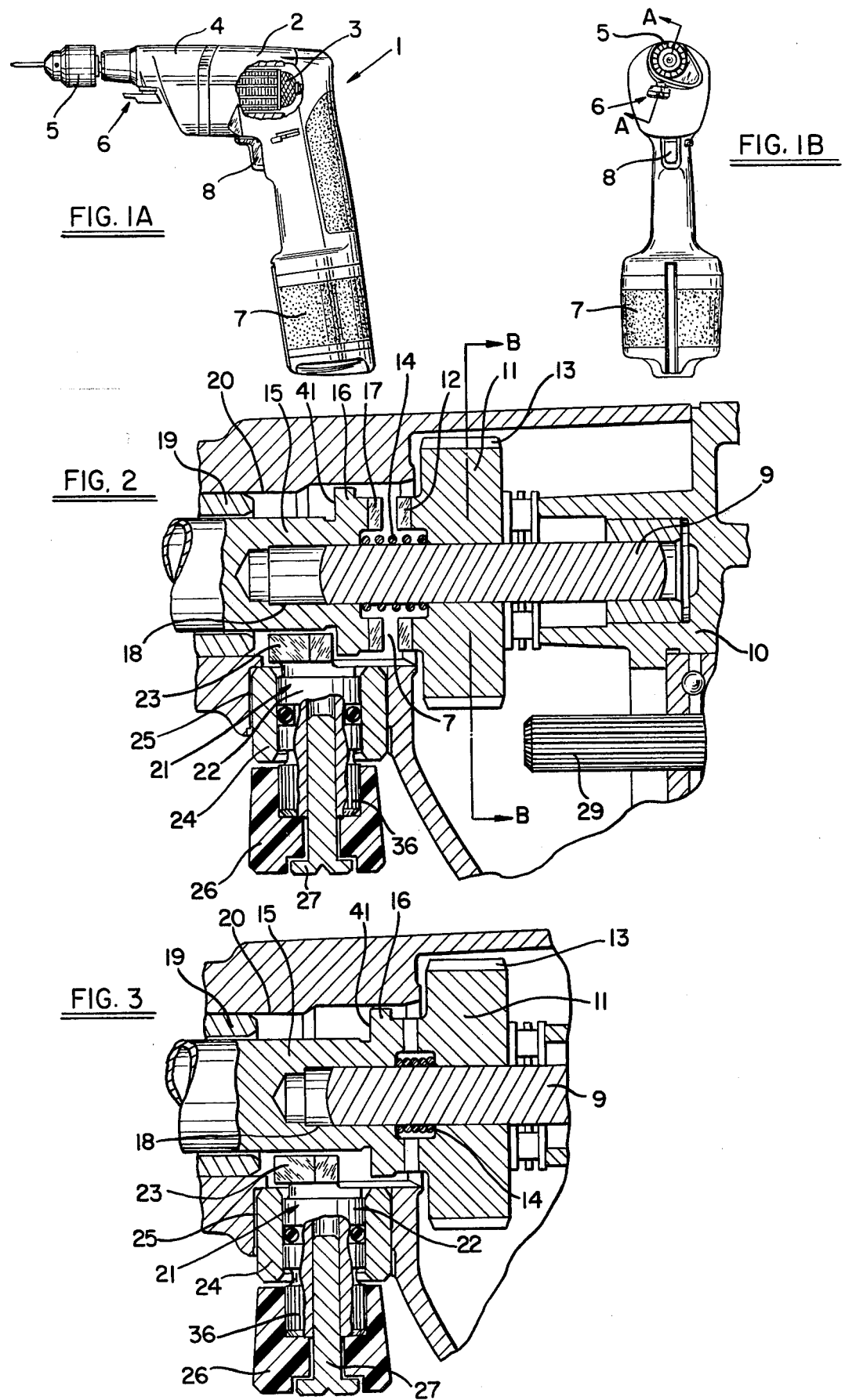

POWER-DRIVEN DRILL AND SCREWDRIVER

BACKGROUND OF THE INVENTION

The invention is directed to a power-driven combination drill and screwdriver that is adjustable to provide either a positive drive connection between the motor and tool element or a drive connection that can be established and interrupted at will by the person operating the tool when required by the nature of the work.

Power-driven combination drill and screwdrivers have clutch members which include a first clutch rotatably mounted in the housing of the tool. An annular bearing is movably mounted in a bore of the housing. A second clutch is rotatably mounted in the annular bearing and is movable relative to the first clutch between the first position whereat the two clutches firmly engage; and, a second position whereat the second clutch is positioned axially away from the first clutch so that the clutches are disengaged. The two clutches are held apart with the aid of biasing means usually in the form of a coil spring which biases the second clutch away from the first clutch. This condition corresponds to the screwdriver mode. When the operator has the tool in the screwdriving mode, he places the tool against the fastener and then exerts pressure on the tool causing the clutches to engage and the screwdriver bit to turn. When the fastener tightens in the workpiece, a ratcheting action occurs because the clutches become disengaged thereby preventing the fastener from becoming stripped or otherwise damaged.

In the prior art devices of which we are aware, the adjustment of the clutches so as to bring them into the drill mode is achieved as suggested for example by U.S. Pat. No. 2,950,626 to Short wherein an annular bearing holds a spindle with the second clutch integral therewith. The bearing threadably engages the housing of the tool so that when the operator rotates the annular bearing, it causes the second clutch to be moved axially so as to come into firm, positive engagement with the first clutch driven by the tool motor thereby placing the tool in the drill mode.

The device of Short includes a spindle bearing threadably engaging a housing and has the disadvantage that the operator must rotate the spindle bearing as much as a whole revolution in order to cause the clutches to positively engage for the drill mode. Further, there is the disadvantage that the housing must be specially threaded to accommodate the spindle bearing which is a costly manufacturing step.

Also, the means for holding the spindle bearing in place and the second clutch in position during the operation of the tool in the drill mode has the disadvantage that during continuous operation, the clutches can become disengaged. For example, the above-mentioned patent to Short discloses a Nylon plug mounted in the motor housing of the tool which can be adjusted so as to press hard against the outer thread of the spindle bearing with which the spindle bearing threadably engages the motor housing. However, in time, the plug wears and it becomes necessary to frequently retighten the plug in the housing against this thread.

SUMMARY OF THE INVENTION

In view of the foregoing it is the object of our invention to provide a combination tool of the type discussed above wherein a simple and easy hand motion will shift the tool from drill mode to screwdriver mode or vice versa. More specifically, it is an object of our invention to provide such a tool wherein the operator need only rotate a manually-adjustable handle through a small angle to shift the tool from one operating mode to the other.

It is another object of our invention to provide a combination drill and screwdriver wherein a holding arrangement is provided to hold the clutch members together in firm engagement in the drill mode as well as to give a positive indication when the second clutch is in its position corresponding to the screwdriving mode.

It is still another object of our invention to provide a combination drill and screwdriver which can be manufactured and assembled at lower cost.

It is a further object of our invention to connect a manually-adjustable handle to a clutch engaging the eccentric member so that the clutches will be firmly engaged and held in mutual engagement by the eccentric member each time the tool is placed in the drill mode.

The invention differs from the combination drill and screwdriver described above in that the combination tool according to the invention incorporates the feature of a cam arrangement for acting directly on the clutch thereby enabling the operator to shift from the screwdriver mode to the drill mode both quickly and positively. The second clutch is an integral part of the output spindle. Because the cam arrangement acts directly on the second clutch, the second clutch with the output spindle can be mounted in a bore of the gear case of the tool. This eliminates the need for cutting an internal thread into the clutch housing for receiving the annular bearing member as is the case in the prior art tool discussed and contributes to reducing the cost of the finished product while at the same time improves performance and reliability.

The power-driven drill and screwdriver includes, according to our invention, a housing and a drive motor mounted in the housing. A case attached to the housing and a first clutch is rotatably mounted in the case and operatively connected to the drive motor. A second clutch is rotatably mounted in the case and slideably movable relative to the first clutch between a first location whereat the second clutch firmly engages the first clutch and a second location whereat the second clutch is disengaged from the first clutch. Biasing means in the form of a coil spring biases the second clutch into the second location. Cam means are mounted on the case so as to be adjustable from one position thereon corresponding to the screwdriving mode of the tool to another position thereon corresponding to the drill mode of the tool.

The cam means is arranged in the case with respect to the second clutch to counteract the urging force of the spring and to displace the second clutch into the first location when the cam means is adjusted from the one position to the other position.

Manually-adjustable means is provided for adjusting the cam means between the two positions. A first limit means and a second limit means coact with the manually-adjustable means for defining the positions corresponding to the screwdriving and drill modes respectively. Connection means connect the manually-actuable means to the cam means so as to cause the first limit means to correspond to one of the positions and the second limit means to correspond to the other one of the positions.

In a preferred embodiment of our invention the cam arrangement can be in the form of an eccentric member rotatably mounted on the case so as to be rotatable from one position thereon corresponding to the screwdriving mode of the tool to another position thereon corresponding to the drill mode of the tool. The eccentric member is arranged in the case with respect to the second clutch to counteract the urging force of the biasing means and to displace the second clutch into the first location when the eccentric member is rotated from the one position to the other position.

The manually-adjustable means can be a handle for rotating the eccentric member between the two positions. The limit means can include a detent in one of the handle and the case and a spring-loaded detent member mounted in the other one of the handle and the case. As mentioned suitable connection means are provided to ensure that the first limit means corresponds to one of the positions and the second limit means corresponds to the other one of the positions. A connection means found to be especially effective is one which includes mutually engaging serrated surfaces at the interface of the handle and the eccentric member.

The eccentric member defines a longitudinal axis which preferably extends in a direction substantially perpendicular to the common axis of the first and second clutches. The shaft of the eccentric member is rotatably journalled in the case so as to cause the cam of the eccentric member to rotate about this longitudinal axis.

BRIEF DESCRIPTION OF THE DRAWING

The above and other objects and advantages of the invention will become more apparent from a reading of the specification taken in conjunction with the enclosed drawings, in which:

FIG. 1A is a side elevation view of a power driven drill and screwdriver tool according to the invention;

FIG. 1B is a front elevation view of the tool shown in FIG. 1A;

FIG. 2 is a side elevation view of the front end of the tool including the gear case partially cut away and in section taken along line A—A of FIG. 1B to show the clutches disengaged and the eccentric member positioned for operation of the tool in the screwdriver mode;

FIG. 3 is likewise a side elevation view, partially in section, taken along line A—A of FIG. 1B and shows the clutch teeth engaged with the tool in the screwdriver mode after the operator has engaged a screw and has applied pressure to the tool;

DESCRIPTION OF THE PREFERRED EMBODIMENTS OF THE INVENTION

Figure 4:
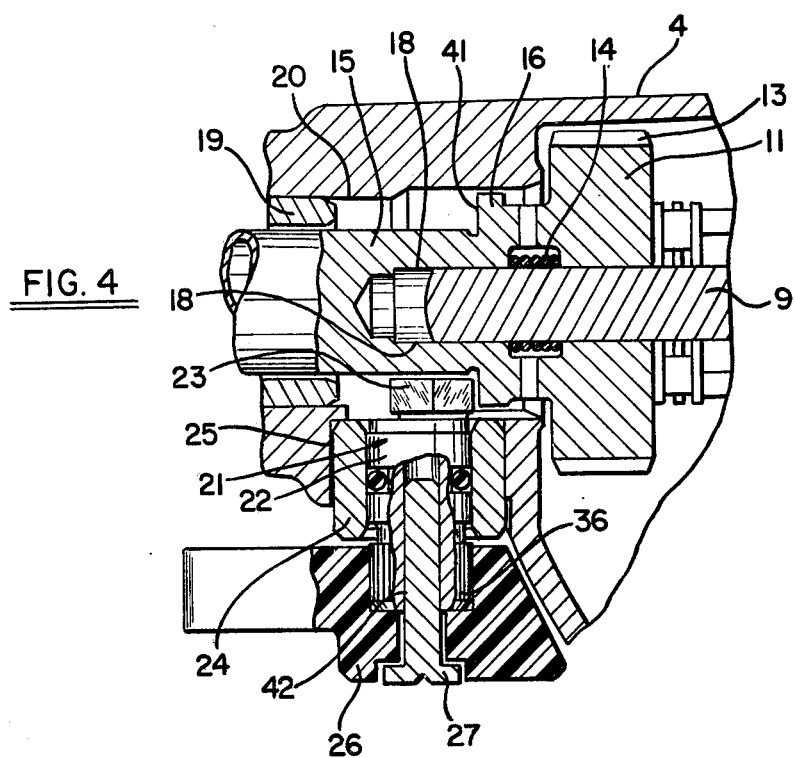
FIG. 4 is also a side elevation view partially in section along line A—A of FIG. 1B and shows the eccentric member rotated so as to bring the clutches into mutual engagement for operation of the tool in the drill mode.

An elevation view of a power-driven combination drill and screwdriver according to the invention is shown in FIG. 1 and designated by reference numeral 1. The tool includes a pistol grip housing 2 wherein there is contained the drive motor 3 and trigger 8 for actuating the tool. A source of energy is provided by a battery pack 7 which engages the housing 2 and is described in detail in U.S. Pat. No. 3,999,110 assigned to The Black and Decker Manufacturing Company of Towson, Md. The tool can also be adapted to be supplied with electric power through a cord set in lieu of a battery pack. A case 4 is attached to the housing 2 and contains the clutch arrangement and speed-reduction gear assembly. The shifting arrangement is indicated by reference numeral 6.

Figure 6:
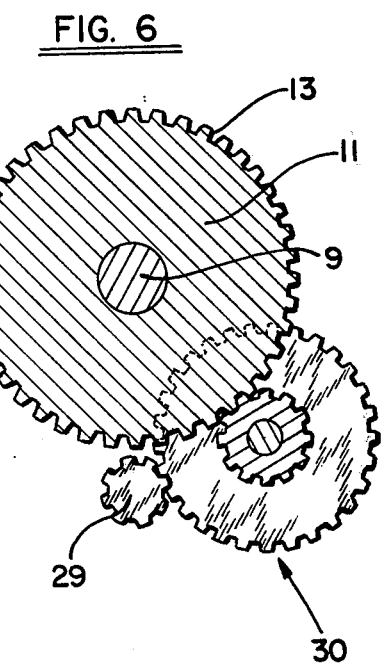
FIG. 6 is a view taken along line B—B of FIG. 2 and shows only the gear reduction arrangement mechanically connecting the motor pinion to the first clutch of the clutch arrangement.

In FIG. 2 the first and second clutches and the shifting arrangement are shown for the screwdriver mode of the tool. The case 4 is shown cut-away to expose the clutch arrangement 7. A shaft 9 is rotatably journalled at one end in the gear case cover 10. A first clutch 11 is fixedly mounted on the shaft 9. The clutch 11 has clutch teeth 12 and a gear 13 formed thereon. The clutch 11 is rotatably driven by the drive motor 3 through a reduction gear assembly shown in FIG. 6. Referring now to FIG. 6, the clutch 11 is driven by motor 3 having a drive pinion 29 mechanically coupled to the gear 13 formed on the clutch 11. Between the pinion and gear is interposed a suitable gear reduction means designated by reference numeral 30 in FIG. 6.

The second clutch 16 includes the output spindle 15 rotatably and slideably mounted in bearing 19 press-fitted into a bore 20 of the case 4. Clutch teeth 17 are formed on the end-face of the second clutch 16. The output spindle 15 has a bore 18 formed therein slideably engaging and rotatably journalling the shaft 9 at its other end. Biasing means in the form of a spring 14 urges the second clutch 16 away from the first clutch 11.

Because of the output spindle 15 and the bearing 19, the second clutch 16 is, in effect, rotatably mounted in the bearing 19 of case 4 so as to be slideably movable relative to the first clutch 11 between a first location whereat the second clutch firmly engages the first clutch and a second location whereat the second clutch 16 is disengaged from the first clutch 11.

A shifting arrangement is provided to shift the tool from the screw-driving mode to the drill mode and includes cam means in the form of an eccentric member 21 having a shaft 22 with a sector cam 23 eccentrically disposed at one end thereof. The shaft 22 is rotatably mounted in a sleeve 24 which, in turn, is press-fitted into a bore 25 of case 4. An O-ring seal 26 is provided to prevent grease from leaking out of the case 4. The shifting arrangement is sealed inside the case 4 and is protected from damage by the contour of the tool.

FIG. 3 shows the combination drill and screwdriver in the screwdriver mode, however, for the condition of the clutch arrangement 7 where the operator of the tool is applying pressure to the tool to drive the fastener, say a screw, (not shown).

In the screwdriving mode shown in FIG. 3, the eccentric member 21 is still in the same position as that shown in FIG. 2 and the spindle 15 and second clutch 16 have been pushed axially into the tool so that the teeth 17 and 12 of the first and second clutches are in mutual engagement and the spring 14 is in compression. When the fastener tightens in the workpiece, the clutches begin to ratchet in the conventional manner to prevent the fastener from becoming stripped or otherwise damaged. The eccentric member 21 with its cam 23 also acts to establish a limit in screwdriving mode as to how far forward the spindle 15 can slide thereby preventing the spindle 15 from protruding outside of the case 4 at the front end of the tool so that it will not pick up dust which could score the bearing 19.

The cam 23 is mounted at the upper end of shaft 22 which extends into the region between the bearing 19 and the clutch 16. The eccentric member 21 is rotatably mounted so as to be adjustable from one position corresponding to the screwdriving mode of the tool shown in FIGS. 2 and 3 to another position corresponding to the drill mode of the tool shown in FIG. 4. The eccentric member 21 acts on the clutch 16 to counteract the urging force of the biasing means 14 and to displace the second clutch 16 into its first location when the eccentric member 21 is rotated. When eccentric member 21 is rotated to place the tool in the drill mode, the cam 23 engages the rear end-face 41 of the second clutch 16 at the cam edge 28.

Figure 5:
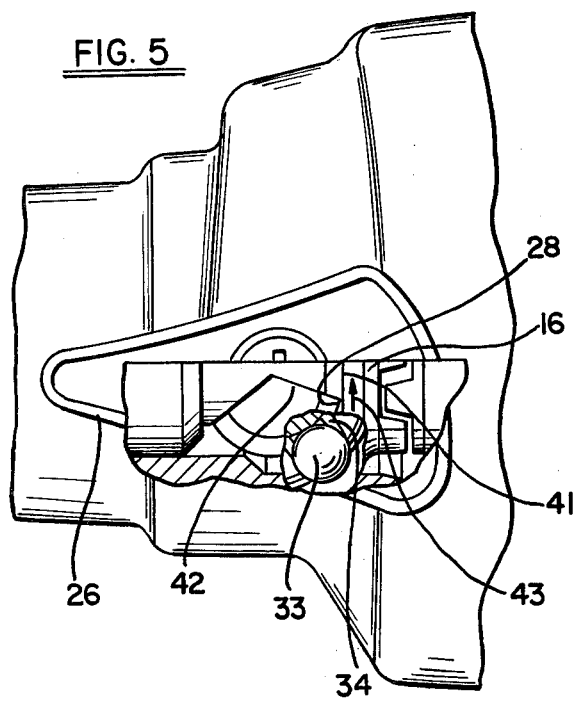
FIG. 5 is a view looking at the bottom gear case in the region of the shifting arrangement with a partial cut-out to show how the cam of the eccentric member engages the flange of the spindle when the tool is in the drill mode.

FIG. 5 includes a cut-away view from below and shows how the cam edge 28 engages the clutch 16 to hold the clutch 16 in its first location corresponding to the drill mode.

To facilitate rotation of the eccentric chamber 21, manually-adjustable means in the form of a handle 26 is provided for adjusting the eccentric member 21 between its two positions. A screw 27 holds the handle 26 and threadably engages a threaded bore 42 in the eccentric member 21.

Figure 7:
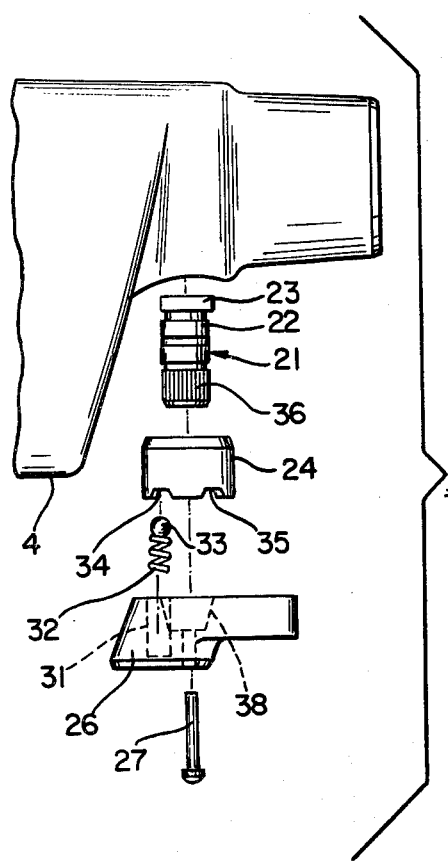
FIG. 7 is an assembly view showing the individual parts of the shifting arrangement including the eccentric member for engaging the second clutch.

FIG. 7 is an assembly view showing various parts of the shifting arrangement. The sleeve 24 is press-fitted into the case 4 and the eccentric member 21 is journalled in the sleeve 24. The handle 26 is provided with a bore 31 for accommodating a spring 32 and detent member in the form of a sphere 33. The sleeve 24 is provided with first and second limit stops in the form of detents 34 and 35 which coact with the spring-loaded detent ball 33. The detents 34 and 35 and spring-loaded detent ball 33 conjointly define first and second limit means which coact with the handle 26 for defining the two positions of the eccentric member 21 corresponding respectively to the first and second locations of the second clutch 16. A partial cut-away in FIG. 5 shows the detent ball engaging the detent 34.

The handle 26 is connected to the eccentric member in a manner to cause a first limit stop to correspond to one of the locations of the clutch 16 and the second limit stop to correspond to the other one of the locations of the clutch 16. In this way, the clutch 16 is accurately positioned for each mode of the tool operation. The handle 26 is preferably made of glass-filled Nylon as this makes it unnecessary to perform a machining operation thereon.

The eccentric member 21 has serrations 36 formed thereon at its lower end which form serrations on the lower wall portion of an opening 38 in the handle 26 when the latter is pressed thereon. The opening 38 in handle 26 has a wall surface corresponding to that of a conical frustum. The serrations 36 and those formed in the handle 26 conjointly define connection means for connecting the handle 26 to the eccentric member 21 so as to cause the fist detent 34 to correspond to one of the positions of the eccentric member and the second detent 35 to correspond to the other one of the positions of the eccentric member 21.

When the tool is assembled, the eccentric member 21 is rotated so as to cause the cam 23 formed thereon to hold the second clutch 16 in close engagement with the first clutch 11. The handle 26 is then press-fitted onto the eccentric member 21 so that the spring-loaded detent ball 33 engages the detent 34 corresponding to the drill mode. Thus, each time the handle 26 is shifted to place the tool in the drill mode, the clutches 16 and 11 will be in close engagement to the same extent.

The serrations 36 cut corresponding serrations into the glass-filled Nylon handle 26 when the same is press-fitted onto the serrated end of the shaft of the eccentric member 21. Placing the handle 26 on the shaft of the eccentric member 21 in the manner described above insures that the handle 26 can be located accurately on the eccentric member 21 so that the detent ball 33 will line up with the detents formed in the sleeve 24 for the first and second locations of the second clutch. The serrations further assure that the eccentric member 21 will not shift with respect to the handle 26 after the tool has been assembled thereby assuring that each time the operator places the tool in the drill mode a close positive engagement of the clutch members is provided thereby minimizing wear on the clutch teeth and precluding slippage in the drill mode for the life of the tool.

Figure 8A:
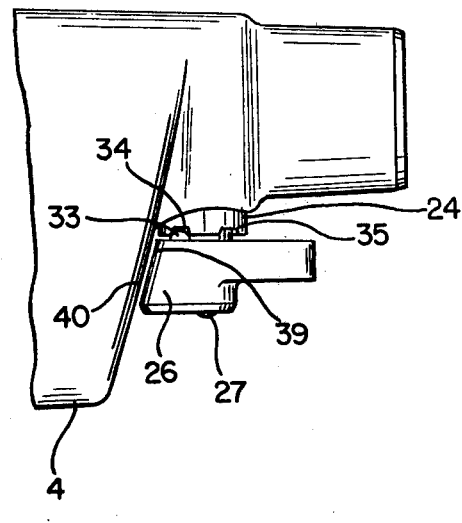
FIG. 8A shows the shift handle in the drill mode with the detent member engaged in the detent corresponding to the drill mode.
Figure 8B:
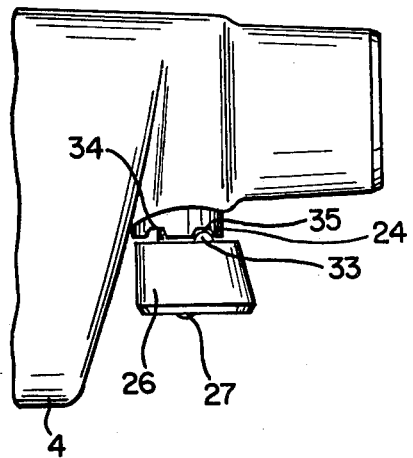
FIG. 8B illustrates the shift handle in the screwdriver mode with the detent member engaging the detent corresponding to the screwdriving mode.

FIG. 8A shows the handle 26 and detent ball 33 engaging detent 34 for the drill mode of the tool. FIG. 8B on the other hand shows the handle rotated approximately 90° and the detent ball 33 engaging the detent slot 35 for the screwdriving mode of the tool.

Referring now to FIG. 8A, the handle 26 is dimensioned in size and contoured so that one of its surfaces 39 will engage surface 40 of the gear case 4 if the handle is rotated beyond the detent 34 corresponding to the drill mode of the tool thereby preventing the operator from holding second clutch 16 too tightly against the first clutch 11. This arrangement of a handle of the shifting mechanism coacting with the gear case is described in detail in the patent application of Thomas C. Laughon filed on the same date as the instant application and entitled: Override Arrangement and Actuating Handle for a Shifting Mechanism in Portable Tools. If the case wall 4 and handle 26 did not coact to limit rotation of the eccentric member 21 beyond detent 34, then the operator could inadvertently bring the clutches 16 and 11 so tightly together that the engaging edge 28 of sector cam 23 could be worn down on the back end-face 41 of the clutch 16 tending to the situation wherein the cam could no longer reliably bring the second clutch 16 into its first location.

When the clutches 16 and 11 only closely engage and the detent ball 33 engages detent 34, a minimal amount of contact and consequent wear will occur between the surface 41 of clutch 16 and the cam 23 at its engaging edge 28 only when the operator runs the tool without applying pressure thereto. When the operator applies pressure to the tool, the clutches 16 and 11 will then very tightly engage causing the end face 41 of clutch 16 to back off of the cam edge 28 a few millimetors so that no engagement therebetween will occur. In addition and referring to FIG. 5, because of the angle that the radial cam surface 42 makes with respect to the direction of rotation of the clutch 16, indicated by arrow 43, the cam edge 28 will not bit into the clutch end-face 41, but rather, will merely drag over it causing only minimal wear.

We claim:
1. A power-driven drill and screwdriver comprising:
a housing having a longitudinal axis;
a drive motor mounted in said housing;
a case attached to said housing;
a first clutch member rotatably mounted in said case and operatively connected to said drive motor;
a second clutch member rotatably mounted in said case and slideably movable relative to said first clutch member between a first location whereat said second clutch member firmly engages said first clutch member and a second location whereat said second clutch member is disengaged from said first clutch member;
means biasing said second clutch member into said second location;
cam means being mounted on said case so as to be rotatably adjustable about an axis transverse to said longitudinal axis from one position on said case corresponding to the screwdriving mode of the tool to another position on said case corresponding to the drill mode of the tool;
said cam means being arranged in said case with respect to said second clutch to counteract the urging force of said biasing means and to displace said second clutch member into said first location when said cam means is adjusted from said one position to said other position;
manually-adjustable means for adjusting said cam means between said two positions;
first limit means and second limit means coacting with said manually-adjustable means for defining said positions, respectively; and,
connection means for connecting said manually-actuable means to said cam means so as to cause said first limit means to correspond to one of said positions and said second limit means to correspond to the other one of said positions.

2. A power-driven drill and screwdriver comprising:
a housing having a longitudinal axis;
a drive motor mounted in said housing;
a case attached to said housing,
a first clutch member rotatably mounted in said case and operatively connected to said drive motor;
a second clutch member rotatably mounted in said case and slideably movable relative to said first clutch member between a first location whereat said second clutch member firmly engages said first clutch member and a second location whereat said second clutch member is disengaged from said first clutch member;
means biasing said second clutch member into said second location;
eccentric cam means being mounted on said case so as to be rotatably adjustable about an axis transverse to said longitudinal axis from one position on said case corresponding to the screwdriving mode of the tool to another position on said case corresponding to the drill mode of the tool;
said eccentric cam means being arranged in said case with respect to said second clutch member to counteract the urging force of said biasing means and to displace said second clutch member into said first location when said cam means is adjusted from said one position to said other position;
manually-adjustable means for adjusting said cam means between said two positions;
first limit means and second limit means coacting with said manually-adjustable means for defining said positions, respectively; and,
connection means for connecting said manually actuable means to said eccentric cam means so as to cause said first limit means to correspond to one of said positions and said second limit means to correspond to the other one of said positions, 3. A power-driven drill and screwdriver comprising:
a housing having a longitudinal axis;
a drive motor mounted in said housing;
a case attached to said housing;
a first clutch member rotatably mounted in said case and operatively connected to said drive motor;
a second clutch member rotatably mounted in said case and slideably movable relative to said first clutch member between a first location whereat said second clutch member firmly engages said first clutch member and a second location wherat said second clutch member is disengaged from said first clutch member;
means biasing said second clutch member into said second location;
an eccentric member rotatably mounted on said case so as to be rotatably adjustable about an axis transverse to said longitudinal axis from one position on said case corresponding to the screwdriving mode of the tool to another position on said case corresponding to the drill mode of the tool;
said eccentric member being arranged in said case with respect to said second clutch member to counteract the urging force of said biasing means and to displace said second clutch member into said first location when said eccentric member is rotated from said one position to said other position;
manually-adjustable handle for rotating said eccentric member between said two positions;
first limit means and second limit means coacting with said manually-adjustable handle for defining said positions, respectively; and,
connection means for connecting said manually-actuable handle to said eccentric member so as to cause said first limit means to correspond to one of said positions and said second limit means to correspond to the other one of said positions.

4. The power-driven drill and screwdriver of claim 3, said handle is made of glass-filled Nylon.

5. The power-driven drill and screwdriver of claim 3, wherein each of said limit means includes a detent in one of said handle and said case and a spring-loaded detent member mounted in the other one of said handle and said case.

6. The power-driven drill and screwdriver of claim 5 wherein said connection means includes mutually engaging serrated surfaces at the interface of said handle and said eccentric member.

7. In a power-driven drill and screwdriver having;
a housing, having a longitudinal axis a drive motor mounted in the housing, a case attached to the housing;
a first clutch member rotatably mounted in the case and operatively connected to the drive motor, a second clutch member rotatably mounted in the case and slideably movable relative to the first clutch member between a first location whereat the second clutch member firmly engages the first clutch member and a second location whereat the second clutch member is disengaged from the first clutch member, a spring biasing the second clutch member into the second location and wherein the improvement comprises:

- a shaft rotatably journalled in said case for rotation about an axis transverse to said longitudinal axis from one position on said case corresponding to the screwdriving mode of the tool to another position on said case corresponding to the drill mode of the tool;
- an eccentric on the shaft for engaging said second clutch member to counteract the urging force of said biasing means to displace said second clutch member into said first location when said shaft is rotated from said one position to said other position;
- manually adjustable means for rotating said shaft between said two positions;
- first limit means and second limit means coacting with manually-adjustable means for defining said positions, respectively; and,
- connection means for connecting said manually-actuable means to said shaft so as to cause said first limit means to correspond to one of said positions and said second limit means to correspond to the other one of said positions.

8. The improvement of claim 7, said manually-adjustable means being a handle attached to said shaft at the outside wall of said case, and said connection means including mutually engaging serrated surfaces at the interface of said handle and said shaft.

9. The improvement of claim 8, wherein each of said limit means includes a detent in one of said handle and said case and a spring-loaded detent member mounted in the other one of said handle and said case.

10. A power-driven drill and screwdriver comprising:

- a housing;
- a drive motor mounted in said housing;
- a case attached to said housing and having a spindle bearing mounted therein;
- a first clutch rotatably mounted in said case axially of said bearing and operatively connected to said drive motor;
- an output spindle journalled in said bearing and having a flange formed thereon;
- a second clutch formed on said flange so as to be adjacent said first clutch;
- said spindle being slideably mounted in said bearing so as to cause said second clutch to be movable relative to said first clutch between a first location whereat said second clutch firmly engages said first clutch and a second location whereat second clutch is disengaged from said first clutch;
- means resiliently biasing said second clutch into said second location;
- an eccentric member rotatably journalled in said case for rotation from one position thereon corresponding to the screwdriving mode of the tool to another position thereon corresponding to the drill mode of the tool;
- said eccentric member being arranged in said case between said bearing and said flange to engage said flange having said second clutch formed thereon to counteract the urging force of said biasing means and to displace said second clutch into said first location when said eccentric member is rotated from said one position to said other position;
- manually-adjustable means for rotating said eccentric member between said two positions;
- first limit means and second limit means coacting with said manually-adjustable means for defining said positions, respectively; and,
- connection means for connecting said manually-actuable means to said shaft so as to cause said first limit means to correspond to one of said positions and said second limit means to correspond to the other one of said positions.

11. The power-driven drill and screwdriver of claim 10, said manually-actuable means being a handle attached to said eccentric member at the outside wall surface of said case, and said connection means including mutually engaging serrated surfaces at the interface of said handle and said shaft.

12. The power-driven drill and screwdriver of claim 11, wherein each of said limit means includes a detent in one of said handle and said case and a spring-loaded detent member mounted in the other one of said handle and said case.

13. A power-driven drill and screwdriver comprising:

- a housing;
- a drive motor mounted in said housing;
- a case attached to said housing and having a spindle bearing mounted therein;
- a first clutch rotatably mounted in said case axially of said bearing and operatively connected to said drive motor;
- an output spindle journalled in said bearing and having a flange formed thereon;
- a second clutch formed on said flange so as to be adjacent said first clutch;
- said output spindle being slideably mounted in said bearing so as to cause said second clutch to be movable relative to said first clutch between a first location whereat said second clutch firmly engages said first clutch and a second location whereat said second clutch is disengaged from said first clutch;
- means resiliently biasing said second clutch into said second location;
- a shaft rotatably journalled in said case for rotation from one position thereon corresponding to the screwdriving mode of the tool to another position thereon corresponding to the drill mode of the tool;
- said eccentric on said shaft, said eccentric being arranged in said case between said bearing and said flange so as to engage said flange having said second clutch formed thereon to counteract the urging force of said biasing means and to displace said second clutch into said first location when said shaft is rotated from said one position to said other position;
- a handle attached to said shaft at the outside wall surface of said case for manually rotating said shaft between said two positions;
- first limit means and second limit means coacting with said handle for defining said positions, respectively; and,
- connection means for connecting said handle to said shaft so as to cause said first limit means to correspond to one of said positions and said second limit means to correspond to the other one of said positions.

14. The power-driven drill and screwdriver of claim 13, wherein each of said limit means includes a detent in one of said handle and said case and a spring-loaded detent member mounted in the other one of said handle and said case.

15. The power-driven drill and screwdriver of claim 14, wherein said connection means includes mutually engaging serrated surfaces at the interface of said handle and said shaft.

16. The power-driven drill and screwdriver of claim 13, comprising:
a collar mounted in said case for journalling said shaft in said case, said collar having an end-face adjacent said handle;
said limit means including a detent formed in one of said end-face and said handle and a spring-loaded detent member mounted in the other one of said end-face and said handle.

17. The power-driven drill and screwdriver of claim 16 wherein said connection means includes mutually engaging serrated surfaces at the interface of said handle and said shaft.

18. A power-driven drill and screwdriver comprising:
a housing;
a drive motor mounted in said housing;
a case attached to said housing and having a spindle bearing mounted therein;
a first clutch rotatably mounted in said case axially of said bearing and operatively connected to said drive motor;
an output spindle journalled in said bearing and having a flange formed thereon;
a second clutch formed on said flange so as to be adjacent said first clutch;
said spindle being slideably mounted in said bearing so as to cause said second clutch to be movable relative to said first clutch between a first location whereat said second clutch firmly engages said first clutch and a second location whereat said second clutch is disengaged from said first clutch;
means resiliently biasing said second clutch into said second location;
an eccentric member rotatably journalled in said case for rotation from one position thereon corresponding to the screwdriving mode of the tool to another position thereon corresponding to the drill mode of the tool;
said eccentric member being arranged in said case between said bearing and said flange to engage said flange having said second clutch formed thereon to counteract the urging force of said biasing means and to displace said second clutch into said first location when said eccentric member is rotated from said one position to said other position;
manually-adjustable means for rotating said eccentric member between said two positions; and,
first limit means and second limit means coacting with said manually-adjustable means for defining said positions respectively.

19. The power-driven drill and screwdriver of claim 18 wherein said eccentric member includes a shaft rotatably mounted in said case and a cam eccentrically mounted on said shaft so as to be disposed between said spindle bearing and said second clutch.

20. The power-driven drill and screwdriver of claim 19 wherein said cam is a sector cam having a shape corresponding to the shape of a sector of a circle, said sector cam having a radial side and an arc periphery conjointly defining an edge for engaging said flange when said eccentric member is rotated from said one position to said other position.

21. The power-driven drill and screwdriver of claim 20, said shaft being positioned for rotation in said gear case so as to cause said edge to engage said flange in said other position in such a manner that said sector cam drags along said flange when said second clutch is rotated during operation of the tool in the drill mode, without pressure being applied to the tool by the operator thereof.

22. The power-driven drill and screwdriver of claim 21 comprising:
connection means for connecting said manually-actuable means to said shaft so as to cause said first limit means to correspond to one of said positions and said second limit means to correspond to the other one of said positions.

23. The power-driven drill and screwdriver of claim 22, said manually-actuable means being a handle attached to said eccentric member at the outside wall surface of said case, and said connection means including mutually engaging serrated surfaces at the interface of said handle and said shaft.

24. The power-driven drill and screwdriver of claim 20, said shaft defining a longitudinal axis extending in a direction substantially perpendicular to the common axis of said first and second clutches, said shaft being rotatably journalled in said case so as to cause said cam to rotate about said longitudinal axis.

25. The power-driven drill and screwdriver of claim 18, said eccentric member defining a longitudinal axis extending in a direction substantially perpendicular to the common axis of said first and second clutches, said eccentric member being rotatably journalled in said case for rotation about said longitudinal axis.

* * * * *